United States Patent [19]

Herring

[11] Patent Number: 4,504,532

[45] Date of Patent: Mar. 12, 1985

[54] PHENOLIC BLAST TUBE INSULATORS FOR ROCKET MOTORS

[75] Inventor: Liles G. Herring, Waco, Tex.

[73] Assignee: Hercules Incorporated, Wilmington, Del.

[21] Appl. No.: 463,366

[22] Filed: Feb. 3, 1983

[51] Int. Cl.³ .................... F16L 7/00; F16L 59/02; D04H 1/58
[52] U.S. Cl. ...................... 428/36; 428/288; 428/323; 428/327; 428/331; 428/403; 428/408; 428/902; 428/903; 524/594; 264/176 R; 60/200.1
[58] Field of Search ............ 428/403, 408, 36, 902, 428/367, 327, 902, 331; 524/594

[56] References Cited

U.S. PATENT DOCUMENTS 4,278,584  7/1981  Noguchi et al. .............. 524/594 X
4,345,003  8/1982  Matsushima et al. .......... 428/403 X

FOREIGN PATENT DOCUMENTS 0020273  12/1982  European Pat. Off. .

Primary Examiner—P. Ives
Attorney, Agent, or Firm—Edmund C. Ross, Jr.

[57] ABSTRACT

Phenolic insulators for blast tubes of rocket motors are disclosed. The insulators are rigid, low density bodies comprising 100 parts by weight crosslinked phenolic resin in which are dispersed finely divided inorganic particulate and fibrous reinforcement selected from carbon fiber, polyaramide pulp and combinations thereof. Compounding these rigid bodies is also disclosed, the compounding including forming a molding crumb containing the aforesaid ingredients.

5 Claims, No Drawings

PHENOLIC BLAST TUBE INSULATORS FOR ROCKET MOTORS

The United States Government has rights in subject matter hereof under FO 4611-80-C-0040 awarded by the Air Force.

BACKGROUND OF THE INVENTION

This invention relates to blast tube insulators for tactical rocket motor blast tubes and improved processes for making these insulators. This invention, more particularly, relates to such insulators that are rigid bodies and comprise cured phenolic resin in which certain organic and inorganic particles are intimately dispersed. This invention, still more particularly, relates to insulators such as these that exhibit char rates comparable to current phenolic insulators containing silica or carbon cloth but which are lower in density and cost.

PRIOR ART

A blast tube is positioned between the nozzle and propellant section of tactical rocket motors when the nozzle is not connected directly to the rocket motor in the missile design. The blast tube, normally a cylindrical conduit, conveys hot combustion products of the propellant in the rocket motor to the nozzle. A blast tube insulator is carried by the blast tube around its inner surface for protecting it from these hot combustion products during flight of the missile.

A blast tube insulator must have thermal properties, including char rates, which are consistent with its high temperature, erosive environment. A currently accepted blast tube insulator comprises phenolic resin and chopped silica or carbon cloth. These current blast tube insulators are expensive and difficult to process; moreover, they are so highly filled with the silica or carbon cloth as to have high densities leading to higher inert weights carried by the tactical rockets in which they are employed.

This invention overcomes these deficiencies of the prior art through incorporation of relatively inexpensive particulates into cured phenolic resins in a manner that reduces the density of the insulator while maintaining acceptable char rates therefor.

More particularly, it has been discovered in accordance with this invention that silica particulate and carbon or polyaramide fibers can replace the chopped carbon or silica cloths of prior art insulators in producing lower cost and density insulators without significant loss in properties, including char rates and without the attendant difficulties of handling such cloths.

OBJECTS OF THE INVENTION

It is an object of this invention to provide blast tube insulators for tactical rocket motors.

It is an object of this invention to provide such insulators which have comparable properties to certain analogous insulators of this prior art while being lower in density and cost.

It is an object of this invention to provide an improved process for making these blast tube insulators.

These and other objects of this invention have been accomplished as will be apparent from the following disclosure.

BRIEF SUMMARY OF THE INVENTION

The blast tube insulators of this invention for tactical rocket motors are rigid bodies having a density in a range between about 0.050 and 0.057 pounds per cubic inch. The insulator bodies consist essentially of 100 parts by weight of a cured phenolic resin in which are dispersed between about 10 and 60 parts by weight finely divided, inorganic particulate and between about 30 and 120 parts by weight of fibrous reinforcement selected from the group consisting of polyaramide pulps, chopped carbon fibers and combinations of these fibers and pulps.

In preparing the blast tube insulators in accordance with this invention, the aforementioned ingredients can be dry blended and the dry blended admixture cured under heat and pressure to form the insulators. Preferably, however, the ingredients are mixed in a vertical planetary mixture in the presence of controlled amounts of solvent for the phenolic resin to form a crumb comprising the admixed ingredients. The crumb, preferably having diameters in the range of between about 4 and 8 millimeters, is then loaded into a mold and cured under heat and pressure in making the insulators. The insulator molded in this fashion can be machined to final dimensional tolerance, as desired.

DETAILED DESCRIPTION OF PREFERRED EMBODIMENTS OF THE INVENTION

The phenolic resin material which cures in making the blast tube insulators of this invention is commercially available. The preferred phenolic resin materials are those sold as Resinox ® phenolics by Monsanto Chemical Company. Other phenolic resin materials suitable for this invention include those, which like the Resinox ® materials, cure by crosslinking a phenolic compound with formaldehyde or other such aldehyde or ketone acting as a difunctional linking moiety. The difunctional linking moiety links the phenolic groups in the phenolic resin materials to provide the crosslinking for the insulators. Hexamethylenetetramine is preferred compound included in the phenolic resin material for producing the formaldehyde for the crosslinking reaction.

The finely divided, inorganic particulate is included in the blast tube insulators in a range between about 10–60 phr, more preferably 15–50 phr where "phr" stands for parts by weight per hundred parts by weight of the aforesaid phenolic resin material. The inorganic filler preferably has a particle size of between about 10 and 50 microns, average diameter, and more preferably between about 20 and 40 microns in average diameter. The preferred inorganic filler is silica, particularly hydrated silica formed by precipitation. Hil Sil ® silica available from Harwick Chemical is the preferred inorganic particulate for use in the insulators of this invention.

Other inorganic particulates can be used in accordance with this invention and include siliceous materials such as mica, glass, quartz and combinations thereof which may be used alone or together with the silica. Preferably, however, the inorganic particulate consists essentially of silica, particularly hydrated silica of the particle size identified above.

The polyaramide pulp suitable for use in this invention is commercially available, sold for example, by E. I. duPont as Kevlar ® aramide pulp fiber. The polyaramide pulp preferably is a short, highly fibrillated fiber in which the fibrillation is resultant of axially oriented, strong crystallites that are less strongly bonded traversely. Fibrillation of the pulp fiber leads to length to diameter ratios (L/D) of over 500. An important advantage of these polyaramide pulps is their very high decomposition temperatures ranging above about 400° C. In addition, these polyaramide pulps are low density and decompose into a strong, adherent char.

The preferred polyaramide pulps have physical properties as set forth in Table I:

TABLE I

| Tensile Strength KPa × 10³ | 3000–4000 |
| --- | --- |
| Tensile Modulus KPa × 10⁶ | 75–100 |
| Elongation % | 3–5 |
| Density g/cc | 1.4–1.5 |
| Filament Dia. um | 10–14 |
| Degradation Temp. | 400–600° C. |
| Thermal Expansion Coefficient | $-2 \times 10^{-6}$/° C. |

Further characterization of suitable polyaramide pulps currently available for use in this invention are set forth in Table II below:

TABLE II

|  | A* | B* | C* |
| --- | --- | --- | --- |
| +14 Mesh | 16 ± 5* | 4 ± 2 | 4 ± 2 |
| −14 +30 Mesh | 22 ± 5 | 17 ± 3 | 17 ± 3 |
| −30 +50 Mesh | 25 ± 3 | 33 ± 5 | 33 ± 5 |
| −50 +100 Mesh | 19 ± 4 | 26 ± 2 | 26 ± 2 |
| −100 Mesh | 17 ± 5 | 20 ± 4 | 20 ± 4 |
| Nominal Average Length | 4 mm | 2 mm | 2 mm |

*Kevlar pulps sold by Dupont as Long Wet Lap, Merge 6F204; Short Wet Lap Merge 6F205; and Dry Pulp Merge 6F218, respectively.

The dry pulp C is preferred for this invention. Drying of the other pulps B and C prior to compounding enhances their utility for use in this invention. The above characterizations of suitable polyaramide pulps is for exemplication only; other similar aromatic polyamides including, for example, polyaramide fibers can be suitably employed in this invention.

The carbon fiber useful as the fibrous reinforcement of the insulating materials is commercially available. The length of the fiber is preferably between about 2 and 10 millimeters with diameters between about 4 and 16 microns. The carbon fiber can be made by heating polyacrylonitrile or pitch filaments for a time sufficient to reduce the fiber to highly carbonized form followed by chopping the filaments into desired form.

Exemplary characteristics for carbon fiber suitable for use in this invention and made from polyacrylonitrile precursor fiber are set forth below in Table III:

TABLE III

| Tensile strength | 2,480 MPa |
| --- | --- |
| Tensile modulus | 206 GOa |
| Ultimate elongation | 1.2% |
| Density | 1.77 g/cm³ |
| Size cointent (% by weight) | 7% max. |
| Bulk density | 280 g/l |
| Filament diameter | 8 microns |
| Filament shape | Round |

The blast tube insulators of this invention can be made by blending the aforedescribed ingredients in dry form followed by introducing the dry blend into a mold. However, use of a dry blend of particulate can result in ingredient separation during handling and storage. Accordingly, the preferred compounding procedure uses an initial dry blending of the insoluble ingredients followed by addition of the phenolic resin materials dissolved in solvent. Use of a vertical planetary mixer device is preferred for this compounding. The addition of dissolved phenolic resin materials to the admixed particles over the period of mixing permits the phenolic resin materials to deposit on the inorganic and organic particulates in the mixture. These particulates, carrying the plated out phenolic resin material, tend to aggomerate during mixing into small clumps. It is preferred that the clumps or crumbs are kept within a particle size of between about 4 and 8 millimeters.

Exemplary solvents for this mixing procedure are low boiling polar solvents such as methylethylketone, acetone, and ethyl alcohol. After the crumb is formed, it is tumbled in dry air (temperature e.g. 60–80%) to remove the solvent.

Curing of the blast tube insulators is under pressure (e.g. 500–2000 psig) at temperatures ranging between 200° and 450° F. A preferred cure cycle is cure at a temperature of between about 200° and 225° F. for between 1–3 hours followed by cure at temperatures in a range between 300° and 400° F. for 1–3 hours. The cured insulators are preferably cooled before release of pressure. The aforementioned dual heating procedure followed by cooling in the mold reduces the probability of cracking during molding of the insulators.

The blast tube insulators of this invention have densities between about 0.052 and 0.054 pounds per cubic inch. This density is lower (e.g. 16%) than certain conventional phenolic blast tube insulators containing chopped carbon or silica cloth. The lower density coupled with comparable char rate performance leads to better insulators for the blast tubes.

Exemplary formulations for the blast tube insulators of this invention are set forth in Tables A and B below.

TABLE A

| Ingredient | Parts by Weight |
| --- | --- |
| Phenolic Resin Materials | 100 |
| Carbon Fiber | 40–120 |
| Silica Particulate | 10–30 |

TABLE B

| Ingredient | Parts by Weight |
| --- | --- |
| Phenolic Resin Materials | 100 |
| Polyaramide Pulp | 40–120 |
| Silica Particulate | 30–50 |

The following examples illustrate this invention but are not meant as a limitation thereof. In these examples, all parts are parts by weight unless specifically noted otherwise. As used in these examples, erosion rate is defined as the thickness of the insulator before test less the thickness after the test divided by action time where action time is the time between when the motor starts to exhaust at 100 psi and when the exhaust tails off to 100 psi. Char rate is defined as insulator thickness after test minus thickness after removal of char divided by the action time. Decomposition rate is defined as the insulator thickness before test minus thickness after char removal divided by the action time. Values of the aforedefined designated with a plus (+) sign indicate accumulation of material such that the substration, noted above, leads to a positive number.

EXAMPLE 1

Set forth in Table 1 below is a comparison between blast tube insulators of this invention (formulations A, B, C) and those of the prior art (D, E). As can be seen from data of this Table 1, the insulators of this invention are lower in density and have comparable properties to insulators of the prior art in two-inch rocket motor test firings. All the insulators (A, B, C) of this invention in Table 1 were prepared by blending of the ingredients followed by molding at 1500–3000 psi for 2–3 hours at about 350° F.

TABLE 1

| Ingredient, phr | A | B | C | D[a] | E[a] |
|---|---|---|---|---|---|
| Phenolic Resin[b] | 100.0 | 100.0 | 100.0 | | |
| Hydrated Silica, precipitated[c] | 20.0 | 20.0 | 20.0 | | |
| Carbon Fiber (¼ inch)[d] | 50.0 | | | | |
| Carbon Fiber[e] | | 50.0 | | | |
| Polyaramide Pulp[f] | | | 100.0 | | |
| Silica Cloth, Chopped (½″ × ½″ sq.) | | | | 400.0 | |
| Phenolic Resin[g] | | | | 100.0 | |
| Phenolic Resin[h] | | | | | 100.0 |
| Carbon Cloth, Chopped (½″ × ½″ sq.) | | | | | 194.1 |
| Erosion Data @ Mass Flux of approx. 1.8 lb./sec. in.$^{2[i]}$ | | | | | |
| Erosion Rate, mil/sec. | 2 | 1 | 1.5 | +6 | 5 |
| Decomposition Rate, mil/sec | 14 | 4.5 | 7 | 29 | 10 |
| Char Rate, mil/sec | 11 | 3 | 5.5 | 36 | 5 |
| Density, lb/in.$^3$ | 0.0536 | 0.0533 | 0.0523 | 0.064 | 0.0542 |

[a]Product of Fiberite Co. MX2646; MX4926
[b]Resinox$^R$ 755 product of Monsanto
[c]Hisil$^R$ product of P.D.G. Industries
[d]Magnamite$^R$ 1810 as product of Hercules Incorporated, passed through roll mills.
[e]Celion C-6 product of Celanese
[f]Kevlar$^R$ 29 pulp, type 979, merge 6F 218
[g]Polyamide modified phenolic resin
[h]Phenolic Resin, MIL-R-9299, Type II
[i]Data from two-inch motor firings As can be seen from the data on Table 1, the insulators of this invention (formulations A, B, C) have erosion, decomposition and char rates comparable to those of the prior art (formulation (D, E). Since the density of the insulator of this invention is lower than the prior art insulators as can also be seen from Table 2, then greater amounts of these low density insulators can be used in rocket motors and yield higher performance insulation for the blast tube than that of the prior art insulators at the same weight.

EXAMPLE 2

Set forth in Table 2 is a summary of data obtained in firing subscale rocket motors that were insulated in accordance with this invention (2A–2J) or the prior art (MX2646, 4926). Table 3 shows the formulations of the blast tube insulators of Table 2. Erosion rate (ER) is defined as insulator thickness before test minus thickness after test divided by action time where action time is the time between when the exhaust first is 100 psi to when it again becomes 100 psi. Decomposition rate (DR) is defined as insulator thickness before test minus after char removal divided by action time. A positive value for ER or DR indicates accumulation of material during test.

As can be seen from Tables 2 and 3, the blast tube insulators of this invention have comparable performance to those of the prior art.

TABLE 2

| Formulation No. | Decomposition Rate mil/sec Mass Flux | | | Erosion Rate mil/sec Mass Flux | | | Density,* lb/cu in. |
|---|---|---|---|---|---|---|---|
| | Low | Med. | High | Low | Med. | High | |
| 2A | 18 | 32 | 35 | +4 | +4 | 1 | 0.0549 |
| 2B | 15 | 24 | 26 | 1 | 1 | 1 | 0.0523 |
| 2C | 12 | 23 | 23 | +28 | +1 | 3 | 0.0412 |
| MX-2646 | 15 | 18 | 21 | +15 | +15 | +9 | 0.064 |
| 2D | 15 | 25 | 28 | +29 | +4 | 1 | 0.0533 |
| 2E | 13 | 32 | 33 | +13 | +3 | 2 | 0.0569 |
| 2F | 13 | 25 | 31 | +8 | +1 | 11 | 0.0461 |
| MX-4926 | 14 | 27 | 36 | +7 | 1 | 4 | 0.0542 |
| 2G | 15 | 20 | 22 | 3 | 7 | 9 | 0.04962 |
| 2H | 13 | 22 | 23 | 2 | 7 | 8 | 0.0502 |
| 2O | 8 | 22 | 26 | 5 | 12 | 20 | 0.05104 |
| 2J | 36 | 46 | 51 | 4 | 4 | 7 | 0.0604 |

*Theretical

TABLE 3

| | Phenolic-Based Insulations | | | | | |
|---|---|---|---|---|---|---|
| Ingredients, phr | 2D | 2A | 2E | XO2646 | MX4926 | 2B |
| Phenolic Resin$^1$ | 100.0 | 100.0 | 100.0 | — | — | 100.0 |
| Silica$^2$ | 20.0 | 26.67 | 40.0 | — | — | 40.0 |
| Graphite Fiber$^3$ | 50.0 | — | — | — | — | — |
| Graphite Fiber$^4$ | — | 66.67 | 100.0 | — | — | — |
| Phenolic Resin (Mil-R-9299, Type II) | — | — | — | 100.0$^5$ | 100.0 | — |
| Silica Cloth, Chopped, ½ × ½ in. | — | — | — | 400.0 | — | — |
| Carbon Cloth, Chopped, ½ × ½ in. | — | — | — | — | 194.1 | — |
| Polyaramide pulp$^6$ | — | — | — | — | — | 100.0 |
| | Elastomeric-Based | | Modified Elastomeric-Based Insulations | | | |

TABLE 3-continued

| Insulations | 2F | 2C | 2G | 2H | 2J | 2K |
|---|---|---|---|---|---|---|
| Chlorosulfonated polyethylene[7] | 80.0 | 50.0 | 100.0 | 100.0 | 100.0 | 100.0 |
| Liquid Polybutadiene[8] | 20.0 | 30.0 | — | — | — | — |
| Polyisoprene[9] | — | 20.0 | — | — | — | — |
| Polyaramide pulp[10] | 50.0 | 50.0 | 200.0 | 1250.0 | 2500.0 | — |
| Starch | 40.0 | 40.0 | 40.0 | 40.0 | 40.0 | 40.0 |
| Magnesia | 6.0 | 2.0 | 6.0 | 6.0 | 6.0 | 6.0 |
| Sulfur accelerator[11] | 2.0 | 1.0 | 2.0 | 2.0 | 1.0 | 1.0 |
| Phenolic resin[12] | 100.0 | 100.0 | 200.0 | 500.0 | 500.0 | 500.0 |
| Peroxy curative[13] | — | 3.75 | — | — | — | — |
| Silica[14] | | | 40.0 | — | — | — |
| Graphite Fiber[15] | | | — | — | — | 2500.0 |

[1]Resinox 755, Monsanto
[2]HiSil, Harwick
[3]Celion 6, Celanese
[4]Magnamite, Hercules
[5]Polyamide modified
[6]Kelvar 29, DuPont
[7]Hypalon LP 999, DuPont
[8]Ricon 150, Colorado Speciality
[9]Natsyn 2200
[10]See 6
[11]Dipentamethylenethiuriumhexasulfide, DuPont
[12]See 1
[13]2,5-dimethyl-2,5di(t-butylperoxy)hexane
[14]See 2
[15]Celion 6, Celeanese

EXAMPLE 3

Forty pound rocket motors were fabricated for testing the blast tube insulators of the invention. The formulations tested were 2B, 2C, and 2D of Example 2, Tables 2 and 3.

Billets of these formulations 2B, 2C, and 2D were molded. Two billets of each were required for testing: 2.5 inch outside diameter by 5 inch long, and 6.6 inch outside diameter by 2.5 inch long. These billets were compression molded in piston-type molds, then cured at 350° F. Blast tube insulator components were machined from the billets and bonded into the blast tube hardware, including ramp section.

The results of firing forty pound motors containing these insulators are shown in Table 4. These results are for four motor firings, 1–4, and show Erosion rate (ER) and Decomposition rate (DR).

As can be seen by the results in Table 4, the insulation of this invention performed favorably.

TABLE 4

| Location/ Motor No. | Mass Flux lb/sec-in$^2$ | Velocity ft/sec | 2C ER | 2C DR | 2B ER | 2B DR | 2D ER | 2D DR |
|---|---|---|---|---|---|---|---|---|
| Ramp Section | | | | | | | | |
| Motor No. 1 | 0.558 | 97 | +7 | 7 | | | | |
|  | 0.700 | 121 | +9 | 6 | | | | |
| Motor No. 2 | 0.529 | 104 | +6 | 5 | | | | |
|  | 0.675 | 132 | +6 | 6 | | | | |
| Blast Tube Section | | | | | | | | |
| Motor No. 2 | 0.832 | 145 | +12 | 6 | | | | |
|  | 2.22 | 388 | 43 | 46 | | | | |
|  | 6.59 | 1213 | 92 | 92 | | | | |
| Motor No. 3 | 0.79 | 155 | | | +4 | 7 | | |
|  | 2.40 | 475 | | | 3 | 13 | | |
|  | 7.20 | 1550 | | | 52 | 55 | | |
| Motor No. 4 | 0.77 | 157 | | | | | 0 | 25 |
|  | 2.36 | 483 | | | | | 5 | 26 |
|  | 8.45 | 2005 | | | | | 12 | 36 |

What is claimed is:

1. A blast tube insulator for tactical rocket motor, said insulator having a density between about 0.050 and 0.57 pounds per cubic inch and being a rigid, molded body which consists essentially of: 100 parts by weight of a cured phenolic resin in which are dispersed particulates consisting of between about 10 and 60 parts by weight finely divided silica particulate and between about 40 and 120 parts by weight of fibrous reinforcement selected from the group consisting of polyaramide pulps, carbon fibers and combination of said fibers and pulps.

2. The blast tube insulator in accordance with claim 1, wherein said fibrous reinforcement comprises said carbon fibers.

3. The blast tube insulator in accordance with claim 1, wherein said fibrous reinforcement comprises said polyaramide pulps.

4. A blast tube insulator for tactical rocket motors, said insulator having a density between about 0.053 and 0.054 pounds per cubic inch, and being a rigid molded body which consists essentially of;
100 parts by weight of a cured phenolic resin in which are dispersed particulates consisting of between about 10 and 30 parts by weight of finely divided silica particulate and between about 40 and 80 parts by weight of fibrous reinforcement selected from carbon fibers having a length in a range between about 4 and 8 millimeters.

5. A blast tube insulator for tactical rocket motors, said insulator having a density between about 0.052 and 0.053 pounds per cubic inch being a rigid molded body which consists essentially of:
100 parts by weight of a cured phenolic resin in which are dispersed particulates consisting of between about 30 and 50 parts by weight of finely divided silica particulate and between about 80 and 120 parts by weight of polyaramide pulp.

* * * * *

UNITED STATES PATENT AND TRADEMARK OFFICE
CERTIFICATE OF CORRECTION

PATENT NO. : 4,504,532
DATED : March 12, 1985
INVENTOR(S) : Liles G. Herring

It is certified that error appears in the above-identified patent and that said Letters Patent are hereby corrected as shown below:

Col. 4, line 19, " 60-80% " should read
-- 60 - 80°F. --;

Col. 5, line 13, " 1500-3000 psi " should
read -- 1500-2000 psi --;

Col. 5, line footnote (c) of Table 1,
" P.D.G. Industries " should read
-- P.P.G. Industries --;

Signed and Sealed this

Sixth Day of August 1985

[SEAL]

*Attest:*

DONALD J. QUIGG

*Attesting Officer*     *Acting Commissioner of Patents and Trademarks*